United States Patent [19]

Carl

[11] Patent Number: 5,679,135
[45] Date of Patent: Oct. 21, 1997

[54] PROCESS FOR OFF-GAS PARTICULATE REMOVAL AND APPARATUS THEREFOR

[75] Inventor: Daniel E. Carl, Orchard Park, N.Y.

[73] Assignee: The United States of America as represented by the United States Department of Energy, Washington, D.C.

[21] Appl. No.: 600,105

[22] Filed: Feb. 8, 1996

[51] Int. Cl.⁶ .......................... B01D 45/14; B01D 47/16
[52] U.S. Cl. .................. 95/149; 55/220; 55/224; 55/238; 95/218
[58] Field of Search .................. 95/149, 151, 210, 95/211, 214, 218, 216; 55/220, 224, 235, 236, 237, 238, 240, 259, 257.1, 260

[56] References Cited

U.S. PATENT DOCUMENTS

| | | | |
|---|---|---|---|
| 2,838,362 | 6/1958 | Robert et al. | 55/220 |
| 3,054,244 | 9/1962 | Hersh | 95/218 |
| 3,365,862 | 1/1968 | Flury | 55/224 |
| 3,605,385 | 9/1971 | Stoop | 55/224 |
| 3,824,768 | 7/1974 | Van Diepnbroek | 55/259 |
| 3,912,164 | 10/1975 | Lefebvie et al. | 239/5 |
| 4,057,404 | 11/1977 | Diemer, Jr. et al. | 55/238 |
| 4,057,602 | 11/1977 | Kolm | 55/224 |
| 4,218,020 | 8/1980 | Reider | 239/406 |
| 4,815,664 | 3/1989 | Tuthill et al. | 239/404 |
| 5,044,559 | 9/1991 | Russell et al. | 239/406 |
| 5,115,634 | 5/1992 | Bretz et al. | 60/39.02 |
| 5,156,659 | 10/1992 | Wright | 55/220 |
| 5,176,325 | 1/1993 | Vidusek | 55/220 |
| 5,224,333 | 7/1993 | Bretz et al. | 60/39.06 |
| 5,256,352 | 10/1993 | Snyder et al. | 261/78.2 |

FOREIGN PATENT DOCUMENTS

| | | | |
|---|---|---|---|
| 55-50450 | 12/1980 | Japan | 95/218 |
| 58-193717 | 11/1983 | Japan | 95/149 |
| 3-158615 | 7/1991 | Japan | 95/149 |

OTHER PUBLICATIONS

Swirl and Counterswirl Effects in Prefilming Airblast Atomizers, J. Eng. for Gas Turbines and Power by M. Aigner & S. Wittig dtd. Jan. 1988 vol. 110/105.
Perry's Chemical Engineers' Handbook Sixth Ed. 1984.

*Primary Examiner*—Jay H. Woo
*Assistant Examiner*—Duane S. Smith
*Attorney, Agent, or Firm*—Thomas G. Anderson; Robert J. Fisher; William R. Moser

[57] ABSTRACT

In the event of a breach in the off-gas line of a melter operation requiring closure of the line, a secondary vessel vent line is provided with a particulate collector utilizing atomization for removal of large particulates from the off-gas. The collector receives the gas containing particulates and directs a portion of the gas through outer and inner annular channels. The collector further receives a fluid, such as water, which is directed through the outer channel together with a second portion of the particulate-laden gas. The outer and inner channels have respective ring-like termination apertures concentrically disposed adjacent one another on the outer edge of the downstream side of the particulate collector. Each of the outer and inner channels curves outwardly away from the collector's centerline in proceeding toward the downstream side of the collector. Gasflow in the outer channel maintains the fluid on the channel's wall in the form of a "wavy film," while the gas stream from the inner channel shears the fluid film as it exits the outer channel in reducing the fluid to small droplets. Droplets formed by the collector capture particulates in the gas stream by one of three mechanisms: impaction, interception or Brownian diffusion in removing the particulates. The particulate-laden droplets are removed from the fluid stream by a vessel vent condenser or mist eliminator.

17 Claims, 2 Drawing Sheets

PROCESS FOR OFF-GAS PARTICULATE REMOVAL AND APPARATUS THEREFOR

CONTRACTUAL ORIGIN OF THE INVENTION

The United States Government has rights in this invention pursuant to Contract No. DE-AC07-81NE44139 between the U.S. Department of Energy and West Valley Nuclear Services.

FIELD OF THE INVENTION

This invention relates generally to the removal of particulates from the gas by-product of an industrial process and is particularly directed to the novel use of an atomizer as a particulate collector for off-gas particulate removal such as in a melter operation involving radioactive particles.

BACKGROUND OF THE INVENTION

In many industrial processes waste is generated in the form of particulate-laden off-gases. The size of the particles can vary widely and may include polychlorinated biphenols, or other hazardous or radioactive particles. One example of an industrial process which produces these types of hazardous gases is shown in the simplified block diagram of a melter system 10 of FIG. 1. The melter system 10 includes a melter vessel 12 wherein glass-based chemicals are added to and heated with a radioactive slurry to form a borosilicate glass containing the radioactive waste which can be cast in canister form for disposal. As this mixture is heated, an off-gas containing radioactive particles is exhausted by means of the combination of an off-gas line 14 and a submerged bed scrubber 18. The submerged bed scrubber 18 removes a large percentage of the radioactive particles from the off-gas. The submerged bed scrubber 18 is large in size, high in cost, and complicated to install in the melter system 10.

In the event of a breach in the melter off-gas line 14, the off-gas is exhausted through a vessel vent line 16 until the off-gas line is repaired or the melter system 10 is shutdown. In order not to compromise emission control during emergency situations, large particulates in the melter off-gas must be removed when exhausted through the vessel vent line 16. To include a second submerged bed scrubber in the vessel vent line 16 to remove the contaminating particulates and excessive moisture is frequently impractical because of space constraints and cost factors.

The aforementioned limitations of the prior art are addressed by the present invention which provides for a removal process for particulates from a radioactive off-gas produced in a melter process wherein a radioactive slurry is mixed with glass-based materials to form a borosilicate glass for the storage of the radioactive waste in the form of glass canisters.

OBJECTS AND SUMMARY OF THE INVENTION

Accordingly, it is the object of the present invention to remove particulates from the off-gas of in industrial process.

It is another object of the present invention to provide apparatus in an off-gas line for producing small liquid droplets in the off-gas flow for removing large particulates from the off-gas.

It is another object of the present invention to provide a process utilizing an particulate collector without moving parts to mix an off-gas with liquid droplets such as water to remove particulates from the off-gas by impaction, interception or Brownian diffusion.

A further object of the present invention is to provide a process utilizing an atomizer as a particulate collector from a melter off-gas line which is of simple construction and highly reliable, small in size, and can be retrofited in existing off-gas lines without requiring modification of the gas flow or pressure in the line.

This invention contemplates a process for removing particulates from a gas stream by directing the gas stream to a first inlet of a particulate collector. The collector directs the gas stream through outer and inner annular channels. A liquid stream is directed to a second inlet of the collector. The liquid stream is directed through an out annular channel along with portion of the particulate laden gas. The outer and inner channels have respective ring-like termination apertures concentrically disposed adjacent one another on the outer edge of the downstream side of the particulate collector. Each of the outer and inner channels curves outwardly away from the collector's centerline in proceeding toward the downstream side of the collector. Gas flow in the outer channel maintains the liquid on the channel's wall in the form of a "wavy film", while the gas stream from the inner channel shears the liquid film as it exits the outer channel thereby reducing the liquid to small droplets. Droplets formed by the collector capture particulates in the gas stream by one of three mechanism: impaction, interception, or Brownian diffusion. The particulate laden droplets are removed from the liquid stream by a condenser or mist eliminator.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF THE PREFERRED EMBODIMENT

Figure 1:
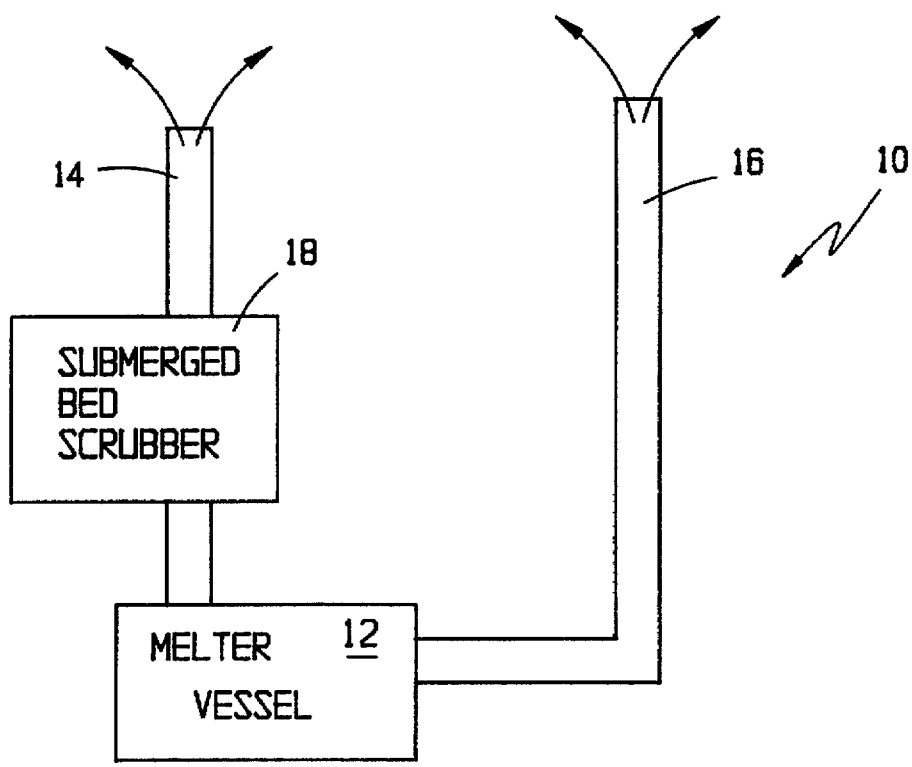
FIG. 1 is a simplified block diagram of a prior art melter system which generates a particulate-bearing off-gas.
Figure 2:
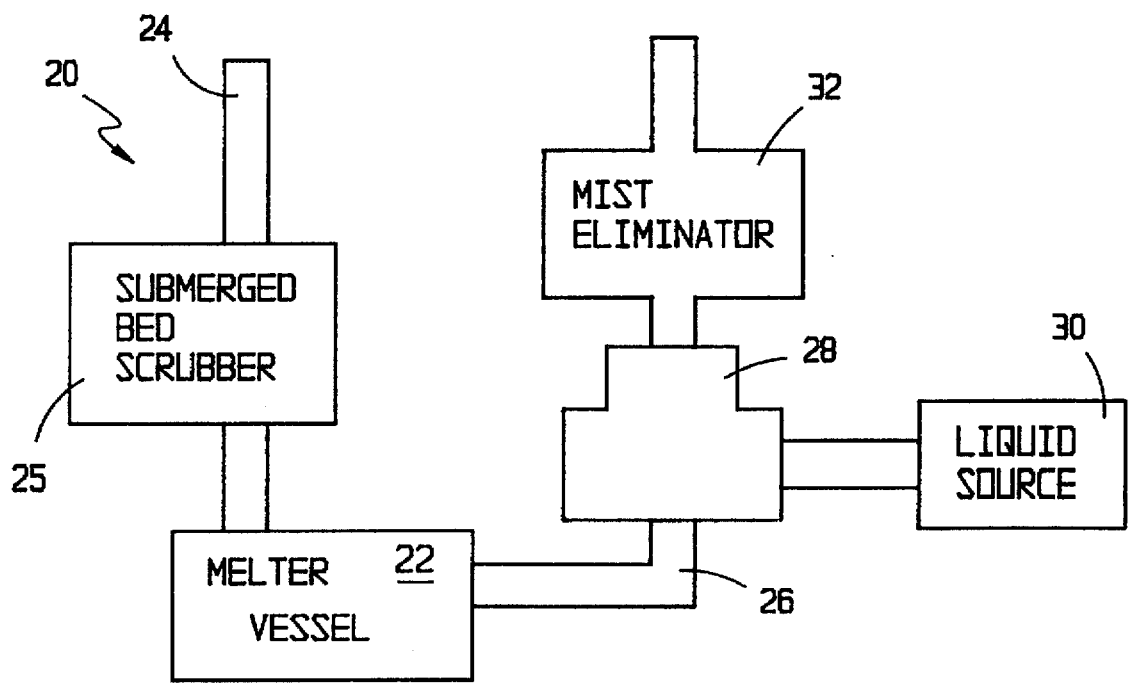
FIG. 2 is a simplified block diagram of a melter system including a particulate collector utilizing atomization of a collector liquid for the removal of contaminating particulates from the melter off-gas when the off-gas is exhausted via a secondary vent line.

Referring to FIG. 2, there is shown a simplified block diagram of a melter system 20 incorporating a particulate collector utilizing atomization of the collector liquid 28 in accordance with the present invention. As in the prior art process described above, melter vessel 22 normally exhausts off-gases by means of an off-gas line 24 which includes a submerged bed scrubber 25. The submerged bed scrubber 25 removes particulates as well as excessive moisture from the off-gas exhausted from the melter vessel 22. In the event the off-gas line 24 is closed, such as for repair, a secondary vessel vent line 26 is provided for exhausting the off-gas until the off-gas line 24 is re-activated.

Disposed in the secondary vessel vent line 26 is a particulate collector 28 as well as a vessel vent condenser or mist eliminator 32. The condenser or mist eliminator 32 removes the particulate-laden droplets produced by the particulate collector 28 from the off-gas as described below. Removal of the dirty droplets from the off-gas exhausted from the secondary vent line 26 insures that the exhausted off-gas meets emission standards. A source of liquid 30 such as water is coupled to the particulate collector 28 for providing a liquid thereto in forming small liquid droplets for capturing the contaminating particulates as described below.

Figure 3:
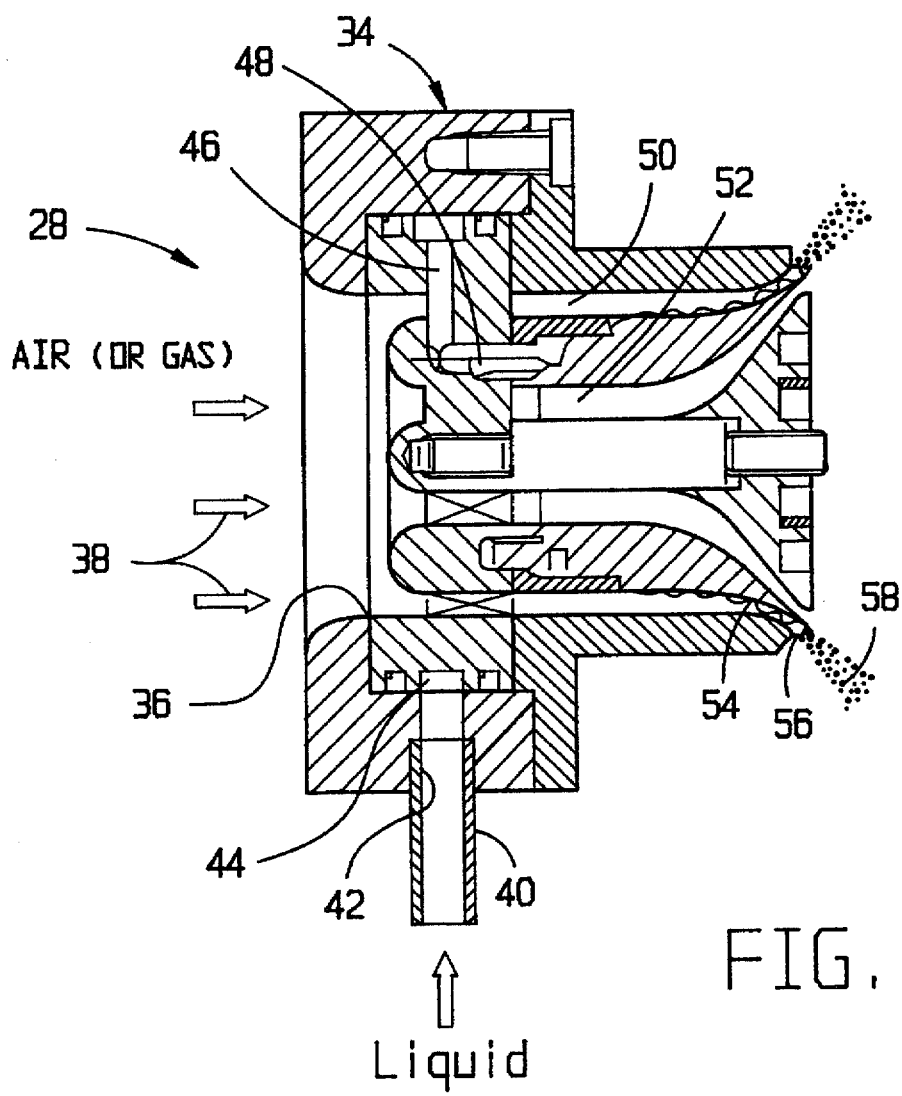
FIG. 3 is a longitudinal sectional view of an particulate collector utilizing atomization incorporated for use in the present invention showing the flow of gas and fluid therethrough.

Referring to FIG. 3, there is shown a longitudinal sectional view of an embodiment of an particulate collector 28 employed in the melter system 20 of FIG. 2. Particulate collector 28 can be of essentially the same design as the airblast atomizer illustrated and described in "Swift and Counterswirl Effects in Prefilming Airblast Atomizers" by M. Aigner and S. Wittig, JOURNAL OF ENGINEERING FOR GAS TURBINES AND POWER, Vol. 110, p. 105, 1988 incorporated herein by reference. As shown, the particulate collector 28 includes a housing 34 having an off-gas inlet 36 which receives the off-gas or air flowing in the direction of arrows 38. The collector housing 34 is coupled to a liquid inlet adapter 40 which, in turn, is coupled to a liquid source 30 as shown in FIG. 2 and described above. The inlet adapter 40 includes a liquid flow channel 42. The particulate-bearing gas is thus introduced into the particulate collector via a gas inlet 36, while the liquid is provided to the collector housing 34 via the liquid inlet adaptor 40. The liquid flow channel 42 is coupled to and continuous with an annular flow channel 44 symmetrically disposed about the particulate collector's longitudinal axis or centerline A—A'. The gas flows via the collector's gas inlet 36 through outer and inner channels 50 and 52 to a downstream end of the collector. Each of the outer and inner channels 50, 52 is annular in shape and symmetrically disposed about the particulate collector's longitudinal axis A—A'. The outer and inner channels 50, 52 terminate in the downstream end portion of the particulate collector 28 in the form of outer and inner ring-like apertures also symmetrically disposed about axis A—A'. The ring-like discharge apertures of the outer and inner channels 50, 52 are arranged in a closely spaced manner around the periphery of the downstream end portion of the collector 28.

With the gas directed through the outer and inner channels 50, 52, the liquid is directed via the annular flow channel 44, radial flow channels 46, and connecting flow channels 48 to the outer channel 50. Each of the outer and inner channels 50, 52 extends outwardly in a curvilinear manner in the direction of the gas and liquid flow through the collector 28 or in the direction toward the collector's downstream end portion. The gas stream directed through the outer channel 50 maintains the liquid flowing through the outer channel in the form of a wavy liquid film 54 on the inner wall of the outer channel. The impinged liquid is maintained on the inner wall of the outer channel 50 by means of a positive gas pressure gradient as well as by the swirl-imparted centrifugal force exerted on the liquid as it travels outwardly from the particulate collector's centerline A—A'. The positive gas pressure gradient applied to the liquid arises from the increase in static pressure which increases with the distance the liquid travels in the direction along the axis of the particulate collector. The wavy liquid film 54 is generated by boundary layer drag at the gas-liquid interface as well as by the liquid surface tension similar to the mechanisms which generate waves on large bodies of water. The liquid accumulates by surface tension at lip 56 prior to atomization.

The shearing effect on the liquid discharged from the outer channel 50 caused by the high velocity gas flow through the inner channel 52 reduces the liquid to small, high number-density droplets. Small, high number-density droplets are most effective for particulate removal. The preferred droplet diameter is less than approximately 50 microns, although larger diameter droplets and a commensurate lower number-dense spray will also be effective in capturing particulates in the gas. The particulates in the gas are typically less than 100 microns in diameter with a median diameter of approximately 50 microns and a significant number of particulates being less than 1 micron in diameter.

Figure 4:
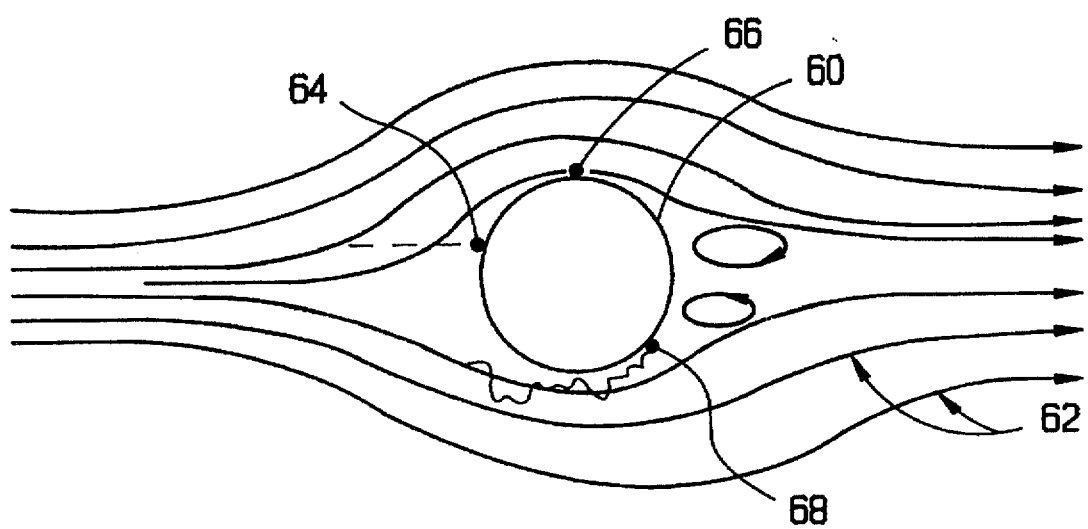
FIG. 4 is a simplified schematic diagram illustrating the three modes of capture of off-gas particulates by liquid droplets produced by the particulate collector.

The liquid droplets 58 generated by the particulate collector 28 capture particulates in the off-gas through any one of three mechanisms: (1) impaction; (2) interception; and (3) Brownian diffusion as shown in the simplified schematic diagram of FIG. 4. In FIG. 4, a liquid droplet 60 is shown as spherical in shape and disposed in the gas flow represented by gas streamlines 62. In the figure, a first particle 64 is captured on the surface of the liquid droplet 60 by means of the impaction mechanism of capture. A second particle 66 is captured by the liquid droplet 60 by means of the interception mechanism. Finally, a third particle 68 is captured on the surface of the liquid droplet 60 by means of the Brownian diffusion mechanism where the particle is shown randomly drifting in the gas flow.

The droplets to which the contaminating particulates adhere are then directed through either a mist eliminator or vessel vent condenser 32 also disposed in the vessel vent line 26 for removal of the particulate laden droplets. The mist eliminator may be a fiber mist eliminator, inertial-impaction device, electrostatic precipitator or other system as described in PERRY'S CHEMICAL ENGINEERING HANDBOOK, Sixth Edition, pp. 18-83 to 18-85 incorporated herein by reference for describing suitable mist eliminators. In a fiber mist eliminator, the particulate ladened droplets pass through a series of fiber beds where the particulates and droplets are removed from the off gas primarily by filtration. The clean off-gas then exits the vessel vent line 26 to the atmosphere. Because good mixing of the off-gas and liquid can be achieved at relatively low pressures, which further provides the atomization necessary for the effective particulate capture, the particulate collector of the present invention will operate effectively at the typical pressures of most off-gas lines.

There has thus been shown a process for off-gas particulate removal including a particulate collector utilizing the novel approach of removing particulates by contact with an atomized liquid. The collector is easily installed in the typical off-gas vent line and does not require modification of the off-gas flow. The collector is of simple, reliable construction, having no moving parts, and generates a high density spray of small diameter droplets which capture the particulates in the off-gas and remove them from the discharged gas. A liquid such as water is mixed with the off-gas in the particulate collector in a manner which applies a large shear force to the liquid as it is discharged from the atomizer thus converting the liquid to a large number of small droplets on the downstream side of the atomizer. The collector is compact, low in cost as compared with other means for removing particulates, and is easily installed in most vent lines.

While particular embodiments of the present invention have been shown and described, it will be obvious to those skilled in the art that changes and modifications may be made without departing from the invention in its broader aspects. Therefore, the aim in the appended claims is to cover all such changes and modification as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

The embodiments of the invention in which an exclusive property or privilege is claimed are defined as follows:

1. A process for removing particulates from a gas stream containing entrained particulates comprising:

dividing the gas stream into first and second portions;

directing the first portion of the gas stream into contact with a liquid flow within a confined channel to maintain the liquid as a liquid film along a wall of the confined channel;

directing the first portion of the gas stream and the liquid film to an aperture for release from the channel;

passing the second portion of the gas stream into contact with the liquid at the aperture at an angle to atomize the liquid into liquid droplets, capture particulates onto the liquid droplets and thereby form a combined stream of gas and atomized liquid with captured particles; and separating the atomized liquid with captured particles from the gas stream.

2. The process of claim 1 wherein the first portion of gas in contact with the liquid film is directed in an annular swirl about and separate from a concentric flow of the second portion of the gas stream prior to contact at the aperture.

3. The process of claim 2 wherein the liquid film accumulates by liquid surface tension at a lip of the aperture in contact with the concentric, second flow portion of the gas stream.

4. The process of claim 1 wherein the particulates are captured by the liquid droplets through contact occurred by impaction, interception or Brownian diffusion.

5. The process of claim 1 wherein the atomized liquid with captured particles is separated from the gas flow by condensation of the atomized liquid onto a surface of lower temperature than the gas to form a liquid flow containing the particles.

6. A process for removing particulates from a gas stream comprising:

directing a first portion of the gas stream to a first inlet of a particulate collector;

directing a fluid stream to a second inlet of the particulate collector;

directing the gas stream from the first inlet to an inner annular channel disposed in the particulate collector;

directing the gas stream through the inner annular channel to an inner annular aperture;

directing the fluid stream and a second protion of the gas stream from the inlets to an outer annular channel disposed in the particulate collector;

directing the the second portion of the gas stream and the fluid stream through the outer annular channel to an outer annular aperture;

atomizing the fluid-gas stream from the outer annular aperture by contacting said stream with the stream from the inner annular aperture so that the particulates are entrapped in the fluid stream;

removing the particulates from the fluid stream; and venting the gas stream from the particulate collector.

7. The process of claim 6 wherein the particulates are removed from the fluid stream by means of condensation.

8. The process of claim 6 wherein the inner and outer annular chambers are curvilinear outwardly from a centerline of the particulate collector.

9. The process of claim 6 wherein the fluid stream is directed onto an inner surface of the outer annular channel of the particulate collector.

10. The process of claim 6 wherein a plurality of inner and outer annular channel and inner and outer annular apertures are symmetrically disposed about a centerline of the particulate collector.

11. An arrangement for removing particulates from an off-gas of a melter having an off-gas line, said arrangement comprising:

a vent line coupled to the melter for receiving the off-gas during an interruption in off-gas flow through the off-gas line;

a source of liquids; and a particulate collector disposed in the vent line for receiving the off-gas and coupled to the source of liquid, the particulate collector including an annular outer channel for receiving the off-gas and liquid and an inner annular channel for receiving the off-gas, wherein the outer and inner channels terminate respectively in a first inner and a second outer aperture concentrically disposed about a longitudinal centerline of the collector, the collector further including a lip disposed intermediate the inner and outer apertures for forming the liquid into small droplets, wherein the particulates adhere to the surface of the droplets.

12. The arrangement of claim 11 further comprising condenser means disposed in the vent line downstream from the particulate collector for removing the particulate-bearing droplets from the off-gas.

13. The arrangement of claim 12 wherein the condenser means includes a mist eliminator or a liquid condenser.

14. The arrangement of claim 11 wherein each of the inner and outer channels is curvilinear outwardly away from a centerline of the collector proceeding toward the upstream end of the collector.

15. The arrangement of claim 14 wherein the collector includes a liquid flow channel coupled to the outer annular channel for receiving and directing the liquid onto an inner surface of the outer annular channel.

16. The arrangement of claim 14 wherein the lip of the particulate collector includes a sharp edge separating the inner and outer annular apertures for directing off-gas from the inner annular aperature over the outer annular aperature in forming a high shear force on the liquid discharged from the outer annular aperature.

17. The arrangement of claim 16 wherein the inner and outer annular channels and inner and outer aperatures are symmetrically disposed about a centerline of the collector.

* * * * *